(12) United States Patent
Otsu et al.

(10) Patent No.: US 10,760,166 B2
(45) Date of Patent: Sep. 1, 2020

(54) SACRIFICIAL ELECTRODE ATTACHMENT STRUCTURE AND ELECTROLYTIC APPARATUS INCLUDING THE SAME

(71) Applicant: DE NORA PERMELEC LTD, Kanagawa (JP)

(72) Inventors: Hideo Otsu, Kanagawa (JP); Koji Yoshimura, Kanagawa (JP)

(73) Assignee: DE NORA PERMELEC LTD, Kanagawa (JP)

( * ) Notice: Subject to any disclaimer, the term of this patent is extended or adjusted under 35 U.S.C. 154(b) by 43 days.

(21) Appl. No.: 15/745,601

(22) PCT Filed: Jun. 9, 2017

(86) PCT No.: PCT/JP2017/021447
§ 371 (c)(1),
(2) Date: Jan. 17, 2018

(87) PCT Pub. No.: WO2018/225239
PCT Pub. Date: Dec. 13, 2018

(65) Prior Publication Data
US 2019/0078217 A1    Mar. 14, 2019

(51) Int. Cl.
C23F 13/10    (2006.01)
C23F 13/18    (2006.01)
C23F 13/14    (2006.01)
C25B 15/00    (2006.01)
C25B 9/00    (2006.01)
(Continued)

(52) U.S. Cl.
CPC .......... *C23F 13/10* (2013.01); *C02F 1/46114* (2013.01); *C23F 13/14* (2013.01);
(Continued)

(58) Field of Classification Search
CPC .......... C23F 13/02; C23F 13/04; C23F 13/06; C23F 13/08; C23F 13/10; C23F 13/16;
(Continued)

(56) References Cited

U.S. PATENT DOCUMENTS 3,477,930 A * 11/1969 Crites .................... F16L 58/187
205/732
3,972,796 A * 8/1976 Frohler .................... C23F 13/02
204/196.3
(Continued)

FOREIGN PATENT DOCUMENTS

CN    202519349 U    11/2012
JP    08-176860 A    7/1996
(Continued)

OTHER PUBLICATIONS

European Search Report issued in application No. 17832179.0 dated Jul. 27, 2018.
(Continued)

*Primary Examiner* — Alexander W Keeling
(74) *Attorney, Agent, or Firm* — Pearne & Gordon LLP (57) ABSTRACT

A sacrificial electrode attachment structure includes: a first pipe in which electrolyte flows; a second pipe which is formed of an insulating material and allows the electrolyte to flow; a cylindrical sacrificial electrode unit arranged between the first pipe and the second pipe so as to allow the electrolyte to flow, and including a sacrificial electrode that contacts the electrolyte; a first pipe joint adapted to liquid-tightly connect the first pipe to the sacrificial electrode unit in a detachable manner; and a second pipe joint adapted to liquid-tightly connect the second pipe to the sacrificial electrode unit in a detachable manner.

13 Claims, 6 Drawing Sheets

(51) Int. Cl.
*C25B 11/00* (2006.01)
*C25C 7/02* (2006.01)
*C25B 11/02* (2006.01)
*C25B 15/08* (2006.01)
*C02F 1/461* (2006.01)

(52) U.S. Cl.
CPC ............. *C23F 13/18* (2013.01); *C25B 9/00* (2013.01); *C25B 11/00* (2013.01); *C25B 11/02* (2013.01); *C25B 15/00* (2013.01); *C25B 15/08* (2013.01); *C25C 7/02* (2013.01); *C02F 2001/46152* (2013.01); *C02F 2201/002* (2013.01); *C02F 2201/4618* (2013.01); *C23F 2213/32* (2013.01)

(58) Field of Classification Search
CPC ...... C23F 13/18; C23F 13/22; C23F 2213/30; C23F 2213/32; C02F 1/461; C02F 1/46104; C02F 1/46109–46176; C02F 2201/00; C02F 2201/002; C02F 2201/004; C02F 2201/46; C02F 2201/461–4619

See application file for complete search history.

(56) References Cited

U.S. PATENT DOCUMENTS

| | | | | |
|---|---|---|---|---|
| 4,140,614 A | * | 2/1979 | McKie | F16L 58/00 204/196.15 |
| 5,006,214 A | * | 4/1991 | Burchnell | C23F 13/02 204/196.16 |
| 5,373,728 A | * | 12/1994 | Guentzler | C23F 13/22 204/196.07 |
| 7,186,327 B1 | * | 3/2007 | Russell | C23F 13/04 205/316 |
| 7,815,779 B2 | * | 10/2010 | Flettner | C02F 1/48 204/248 |
| 2004/0099539 A1 | * | 5/2004 | Yule | C23F 13/02 205/734 |
| 2011/0180417 A1 | * | 7/2011 | Steimke | C25B 1/02 205/337 |
| 2011/0240485 A1 | | 10/2011 | Palmer | |
| 2016/0002076 A1 | * | 1/2016 | Jha | C02F 1/469 204/520 |

FOREIGN PATENT DOCUMENTS

| | | | |
|---|---|---|---|
| JP | 08176860 | * | 7/1996 |
| JP | 2006336041 A | | 12/2006 |
| JP | 2016204698 A | | 12/2016 |

OTHER PUBLICATIONS

International Search Report and Written Opinion issued in international application No. PCT/JP2017/021447 dated Jul. 4, 2017; 10 pages (English translation of Written Opinion provided).

* cited by examiner

SACRIFICIAL ELECTRODE ATTACHMENT STRUCTURE AND ELECTROLYTIC APPARATUS INCLUDING THE SAME

TECHNICAL FIELD

The present invention relates to a sacrificial electrode attachment structure and an electrolytic apparatus including the same.

BACKGROUND ART

In a metallic electrolyzer used in a manufacturing device or a water treatment facility for various kinds of chemical products, a current circuit in which part of direct current having flown into an electrode returns to the electrode via part of the electrolyzer and an accessory device of the electrolyzer may be formed. In this case, the electrolyzer or accessory device may be corroded.

As a method of suppressing such corrosion, it is known to attach a sacrificial electrode to a supply flow path and a discharge flow path of electrolyte.

Depending on application of the electrolyzer, the sacrificial electrode may be depleted in a short period. Therefore, the sacrificial electrode may need to be replaced. Patent Literature 1 discloses a sacrificial electrode attachment structure in which replacement can be performed. In the attachment structure, a female thread is formed inside a main pipe constituting a flow path of electrolyte, and a male thread formed at an end portion of the sacrificial electrode is screwed into the female thread.

CITATION LIST

Patent Literature

Patent Literature 1: CN 202519349 U

SUMMARY OF INVENTION

Technical Problem

In a sacrificial electrode attachment structure disclosed in Patent Literature 1, a screwed portion including a male thread of a sacrificial electrode and a female thread of a main pipe is exposed in electrolyte. Therefore, the electrolyte may enter an interface between the male thread and the female thread, and these screws and the vicinity thereof may be corroded. In the case where the male thread and the female thread are fixed to each other with a corrosion product, or in the case where the male thread or the female thread is eroded and cannot keep an original shape, it is not easy to replace a sacrificial electrode. Furthermore, in the sacrificial electrode attachment structure disclosed in Patent Literature 1, since the sacrificial electrode is incorporated in the main pipe constituting a flow path of the electrolyte, a state of the sacrificial electrode cannot be visually checked from the outside.

Solution to Problem

The present invention provides a sacrificial electrode attachment structure and an electrolytic apparatus including the same, in which a depletion state of a sacrificial electrode can be easily confirmed and a sacrificial electrode can be easily replace.

A sacrificial electrode attachment structure according to the present invention is a sacrificial electrode attachment structure contacting electrolyte, and includes: a first pipe in which electrolyte flows; a second pipe which is formed of an insulating material and allows the electrolyte to flow; a cylindrical sacrificial electrode unit arranged between the first pipe and the second pipe so as to allow the electrolyte to flow, and including a sacrificial electrode that contacts the electrolyte; a first pipe joint configured to liquid-tightly connect the first pipe to the sacrificial electrode unit in a detachable manner; and a second pipe joint configured to liquid-tightly connect the second pipe to the sacrificial electrode unit in a detachable manner.

In the above-described structure, the sacrificial electrode that contacts the electrolyte is provided in the cylindrical sacrificial electrode unit, and the sacrificial electrode unit is detachably connected, by the first pipe joint, to the first pipe connected to the electrolyzer. Additionally, the sacrificial electrode unit is detachably connected to the second pipe by the second pipe joint. Therefore, in the case of replacing the sacrificial electrode, these pipe joints are detached and the used sacrificial electrode unit is separated and detached from the first pipe and the second pipe, and then a new sacrificial electrode unit is set between the first pipe and the second pipe and fixed by the pipe joints. Thus, the sacrificial electrode is easily replaced. The second pipe is formed of the insulating material and prevented from being corroded by the electrolyte, and the sacrificial electrode is more easily replaced.

Preferably, the second pipe is formed of a material through which the sacrificial electrode can be visually checked from outside. With this structure, a state of the sacrificial electrode unit inserted into the second pipe can be visually checked from the outside of the pipe. In other words, since a depletion state of the sacrificial electrode can be easily visually confirmed, a sacrificial electrode replacement plan is easily prepared, and furthermore, corrosion and breakage of the electrolytic apparatus caused by unassumed depletion of the sacrificial electrode can be suppressed.

According to another aspect of the present invention, the entire sacrificial electrode unit is the sacrificial electrode. With this structure, since the entire sacrificial electrode unit is formed of the sacrificial electrode material, a period during which the sacrificial electrode unit can functions as the sacrificial electrode can be prolonged. Thus, a replacement span of the sacrificial electrode unit can be prolonged.

According to an aspect of the present invention, the first pipe may be formed of a conductive material, and the sacrificial electrode unit may be separated from the first pipe. Since the sacrificial electrode unit is separated from the first pipe, even when the sacrificial electrode unit is deformed due to corrosion, detachment from the first pipe is performed easily.

In this case, preferably, the attachment structure further includes a spacer surrounded by the first pipe joint and formed of an insulating material interposed between the sacrificial electrode unit and the first pipe. A space can be secured between the sacrificial electrode unit and the first pipe by the spacer.

In the case where the first pipe is formed of the conductive material and the sacrificial electrode unit is separated from the first pipe, the sacrificial electrode unit and the first pipe may be electrically connected by a wire formed of a conductive material. With this structure, since the sacrificial electrode unit and the first pipe are electrically connected by the wire formed of the conductive material, leakage current flowing between the sacrificial electrode unit and the first pipe passes through the wire. Therefore, in the case of measuring leakage current, the current flowing through the wire portion is to be measured. Therefore, the leakage current can be easily measured.

Preferably, the first pipe is formed of titanium or a titanium alloy. Since the titanium or titanium alloy has high corrosion resistance, the sacrificial electrode is more easily replaced.

Preferably, the sacrificial electrode unit includes a shaft portion and a flange portion formed at an end portion of the shaft portion and expanding radially outward, the first pipe joint includes a cylindrical main wall portion and an end wall portion located at an end portion of the main wall portion and projecting radially inward, a female thread is formed on an inner peripheral surface of the main wall portion, a male thread is formed at an end portion of the first pipe, a through hole is formed on the end wall portion, the shaft portion of the sacrificial electrode unit is inserted into the through hole of the end wall portion, the flange portion of the sacrificial electrode unit is arranged inside the main wall portion, and the male thread at the end portion of the first pipe is screwed into the female thread of the main wall portion. In this case, the sacrificial electrode can be easily detached from the first pipe by releasing a screwed state between the end portion of the first pipe and the main wall portion.

According to another aspect of the present invention, the first pipe joint may include: a connecting pipe having flexibility, formed of an insulating material, and inserted in a state that the first pipe and the sacrificial electrode unit are spaced apart from each other, and a fastening tool arranged around the connecting pipe, and adapted to fix the connecting pipe to the first pipe and the sacrificial electrode unit by radially reducing the connecting pipe. In this case, the sacrificial electrode can be easily detached from the first pipe by operating the fastening tool.

Preferably, the second pipe is formed of a flexible material, and the sacrificial electrode unit is inserted into the second pipe. In this case, the sacrificial electrode can be easily detached from the second pipe by pulling out the sacrificial electrode unit from the second pipe.

The second pipe joint may include a fastening tool arranged around the second pipe, and adapted to fix the second pipe to the sacrificial electrode unit by radially reducing the second pipe. In this case, the sacrificial electrode can be easily detached from the second pipe by operating the fastening tool.

An electrolytic apparatus according to an aspect of the present invention includes an electrolyzer adapted to perform electrolysis for the electrolyte, wherein the first pipe in the above-described sacrificial electrode attachment structure is connected to or integrally provided with the electrolyzer. With this structure, it is possible to achieve the electrolytic apparatus in which a sacrificial electrode is easily replaced.

An electrolytic apparatus according to an aspect of the present invention includes: an electrolyzer adapted to perform electrolysis for the electrolyte; and a plurality of electrolyte paths connected to electrolyzer, wherein one or more of the sacrificial electrode attachment structures described above are provided in the electrolyte path. Since one or more of the sacrificial electrode attachment structures described above are provided in the electrolyte path, the electrolyzer is adequately protected, and furthermore, in the case of connecting a manifold to the electrolyzer by the plurality of electrolyte paths, the electrolyzer and manifold are adequately protected as described later. Additionally, since the sacrificial electrode attachment structure according to the present invention is applied to these sacrificial electrode units, the sacrificial electrode can be easily replaced.

Advantageous Effects of Invention

According to the present invention, it is possible to provide the sacrificial electrode attachment structure and the electrolytic apparatus including the same, in which the depletion state of the sacrificial electrode can be easily visually confirmed and replacement can be easily performed.

DESCRIPTION OF EMBODIMENTS

Embodiment of the present invention will be described below in detail with reference to the drawings.

Figure 1:
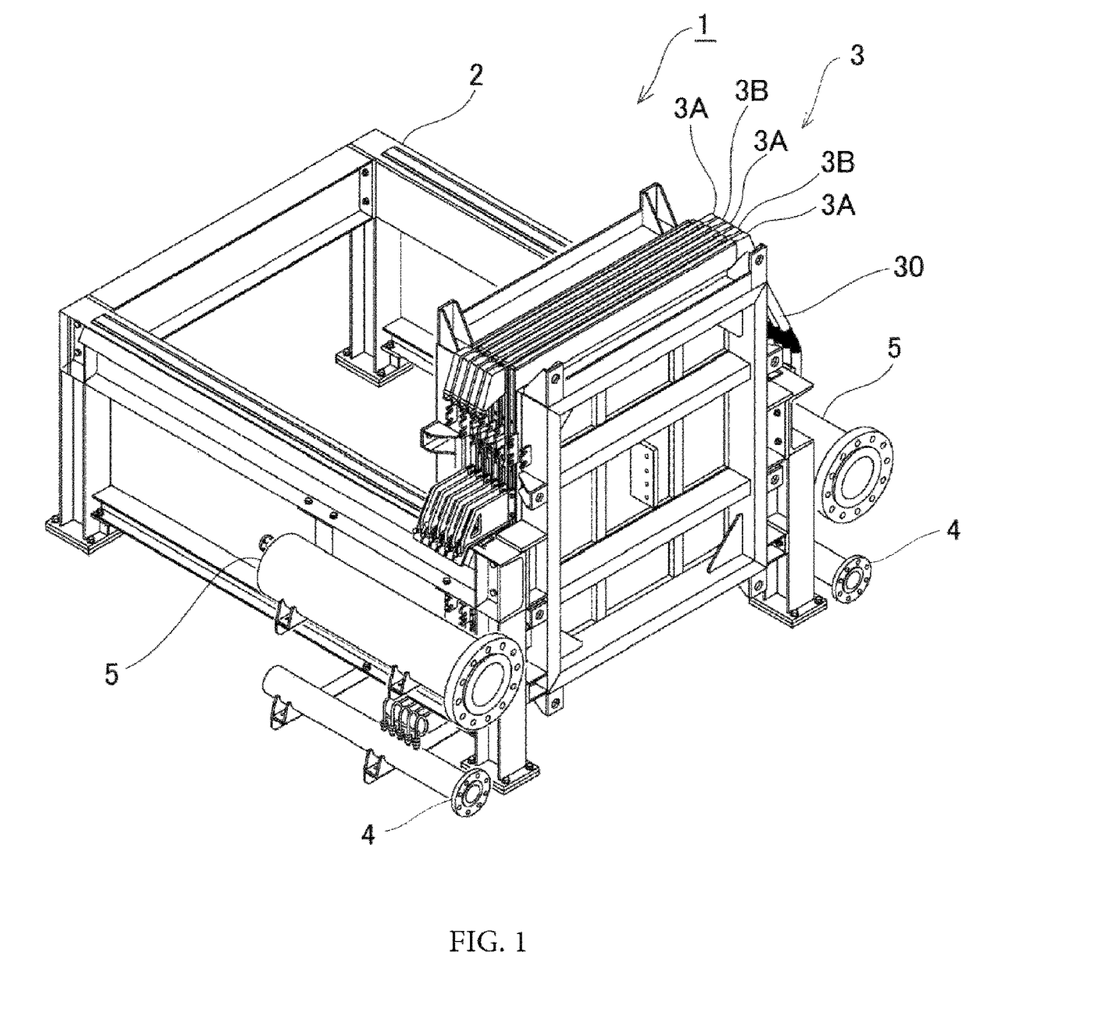
FIG. 1 is a perspective view of an electrolytic apparatus including a sacrificial electrode attachment structure according to an embodiment of the present invention.

FIG. 1 is a perspective view of an electrolytic apparatus 1 including a sacrificial electrode attachment structure according to the present embodiment. The electrolytic apparatus 1 includes a main body frame 2 and an electrolyzer 3 supported by the main body frame 2. Electrolyte is stored in the electrolyzer 3. The electrolyzer 3 includes: a plurality of anode units 3A each including an anode inside thereof; and a plurality of cathode units 3B each including a cathode inside thereof. The anode units 3A and the cathode units 3B are alternately arranged, and internal spaces thereof communicate with each other such that the electrolyte can flow through the units.

An electrolyte supply manifold 4 and an electrolyte discharge manifold 5 are provided outside the main body frame 2. The electrolyte supply manifold 4 is connected to each of the units 3A, 3B of the electrolyzer 3 via a plurality of electrolyte supply paths (not illustrated in FIG. 1). The electrolyte discharge manifold 5 is connected to each of the units 3A, 3B of the electrolyzer 3 via a plurality of electrolyte discharge paths (not illustrated in FIG. 1).

The electrolyte is supplied from the outside to the electrolyte supply manifold 4. The electrolyte supplied to the electrolyte supply manifold 4 is supplied to each of the units 3A, 3B of the electrolyzer 3 via the electrolyte supply paths. In the electrolyzer 3, electrolysis is performed by voltage applied to the electrolyte. The electrolyte used for electrolysis is discharged from each of the units 3A, 3B to the electrolyte discharge manifold 5 via the electrolyte discharge paths. The electrolyte discharged to the electrolyte discharge manifold 5 is supplied again to the electrolyte supply manifold 4 after applied with various kinds of treatment such as separation of a product generated by the electrolysis, cooling, and replenishment of a substance consumed by the electrolysis. Not only the electrolyte inside the electrolyzer 3 but also the electrolyte inside the electrolyte supply manifold 4 and the electrolyte discharge manifold 5 also contain ions generated by the electrolysis.

Figure 2:
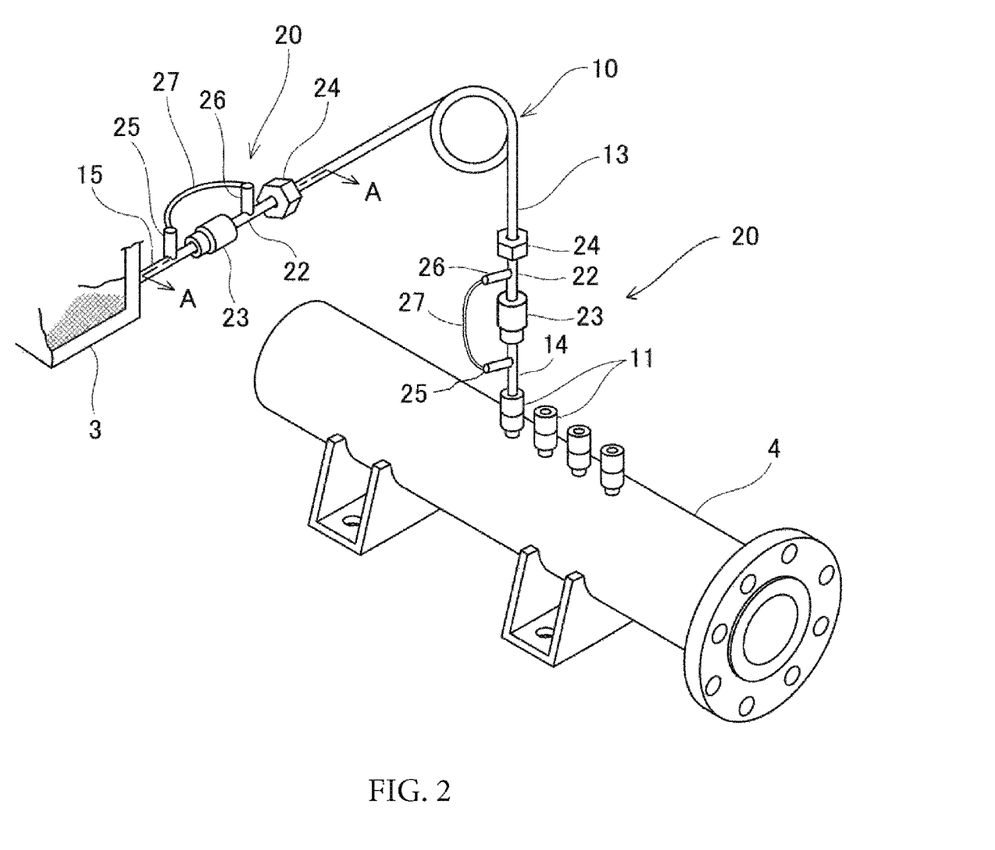
FIG. 2 is a perspective view of an electrolyte supply path of the electrolytic apparatus.

FIG. 2 is a perspective view of an electrolyte supply path 10 connecting the electrolyte supply manifold 4 to the electrolyzer 3. FIG. 2 illustrates only one electrolyte supply path 10 for simplification, but actually a plurality of electrolyte supply paths 10 is provided for each of the plurality of units 3A, 3B, and each electrolyte supply path 10 has a similar structure.

In each electrolyte supply path 10, two sacrificial electrode units 22 are provided. More specifically, one sacrificial electrode unit 22 is provided at an end portion of the electrolyte supply path 10 on the electrolyzer 3 side, and the other sacrificial electrode unit 22 is provided at an end portion of the electrolyte supply path 10 on the electrolyte supply manifold 4 side. In the case of connecting the electrolyte supply manifold 4 to the electrolyzer 3 by the plurality of electrolyte supply paths 10, current flows from a member with high potential to a member with low potential. For example, the current is made to flow from an anode inside the electrolyzer 3 to the electrolyte supply path 10 and the electrolyte supply manifold 4 by the supplied electrolyte. Therefore, corrosion in not only the electrolyzer but also the electrolyte supply manifold 4 should be considered. Since the two sacrificial electrode units 22 are provided on the electrolyzer 3 side and the electrolyte supply manifold 4 side in each of the electrolyte supply paths 10, the electrolyzer 3 and the electrolyte supply manifold 4 are adequately protected.

A structure of the electrolyte supply path 10 will be described more specifically. A nozzle (first pipe) 14 is connected to an electrolyte supply port of the electrolyte supply manifold 4 by a nut 11. In the present embodiment, a pipe connected to the electrolyte supply manifold 4 is the nozzle 14.

The nozzle 14 is connected to the sacrificial electrode unit 22 by a first pipe joint 23. The sacrificial electrode unit 22 is connected to a pipe (second pipe) 13 by a second pipe joint 24. The pipe 13 is formed of a transparent or translucent flexible insulating material such as perfluoroalkoxy fluorine resin (PFA).

Additionally, the pipe 13 is connected to the other sacrificial electrode unit 22 by the other second pipe joint 24. The sacrificial electrode unit 22 is connected to a nozzle (first pipe) 15 by the other first pipe joint 23. The nozzle 15 is a pipe connected to or integrally provided with the electrolyzer 3.

Thus, the electrolyte supply path 10 includes, in the order from the electrolyte supply manifold 4 side, the nozzle 14, first pipe joint 23, sacrificial electrode unit 22, second pipe joint 24, pipe 13, second pipe joint 24, sacrificial electrode unit 22, first pipe joint 23, and nozzle 15 located on the electrolyzer 3 side. In the electrolyte supply path 10, two sacrificial electrode attachment structures 20 are provided at the electrolyte supply path 10 for the two sacrificial electrode units 22. The pipe 13 can be deemed to be shared by the two sacrificial electrode attachment structures 20.

Figure 3:
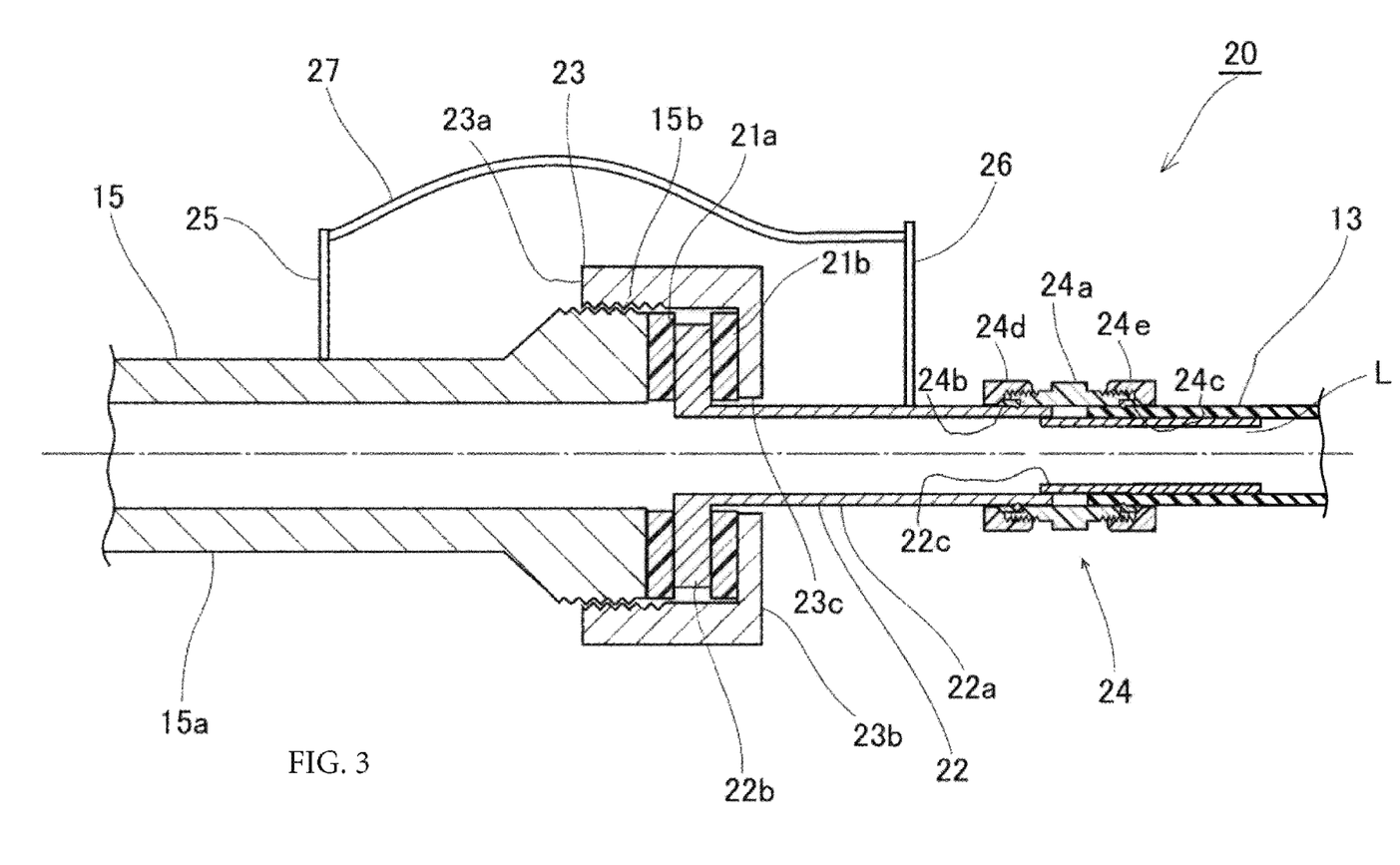
FIG. 3 is a cross-sectional view of the sacrificial electrode attachment structure provided in the electrolyte supply path of the electrolytic apparatus.

FIG. 3 is a cross-sectional view taken along a line A-A in FIG. 2 and illustrates the sacrificial electrode attachment structure 20 provided at the electrolyte supply path 10 of the electrolyzer 3. The sacrificial electrode attachment structure 20 in FIG. 3 is an attachment structure on the electrolyzer 3 side of FIG. 2 and includes the nozzle 15. The attachment structure 20 on the electrolyte supply manifold 4 side in FIG. 2 is also basically the same as this attachment structure except that the nozzle 15 is replaced by the nozzle 14.

The sacrificial electrode attachment structure 20 includes the nozzle 15, pipe 13, cylindrical sacrificial electrode unit 22, first pipe joint 23, and second pipe joint 24. The first pipe joint 23 liquid-tightly connects the nozzle 15 to the sacrificial electrode unit 22 in a detachable manner. The second pipe joint 24 liquid-tightly connects the pipe 13 to the sacrificial electrode unit 22 in a detachable manner.

The nozzle 15 is provided in each of the units 3A, 3B of the electrolyzer 3. The nozzle 15 is formed of a high corrosion-resistant conductive material such as a metal, more specifically, titanium or a titanium alloy. The nozzle 15 includes a shaft portion 15a and a head portion 15b, and the shaft portion 15a and the head portion 15b are integrally formed. The shaft portion 15a is formed in a cylindrical shape and connected to the electrolyzer 3. In other words, the inside of the electrolyzer 3 is in communication with the inside of the shaft portion 15a.

The head portion 15b is substantially cylindrical and provided at an end portion of the shaft portion 15a on an opposite side of the electrolyzer 3, and has an outer diameter larger than an outer diameter of the shaft portion 15a. A male thread is formed on an outer peripheral surface of the head portion 15b.

The sacrificial electrode unit 22 includes a shaft portion 22a, flange portion 22b, and a sacrificial electrode 22c. The shaft portion 22a is formed in a cylindrical shape and arranged coaxially with the nozzle 15. The shaft portion 22a has an outer diameter and an inner diameter substantially equal to an outer diameter and an inner diameter of the pipe 13.

The flange portion 22b expands radially outward from an end portion of the shaft portion 22a on the nozzle 15 side. The shaft portion 22a and the flange portion 22b are integrally formed of a conductive material such as a metal. The flange portion 22b has an outer diameter slightly smaller than an outer diameter of the nozzle 15.

In FIG. 3, the sacrificial electrode 22c is a cylindrical member coaxially inserted into an end portion of the shaft portion 22a on the pipe 13 side. The sacrificial electrode 22c is formed of a material exhibiting high durability during electrolysis. For example, (1) a platinum group metal (platinum, ruthenium, rhodium, palladium, osmium, iridium) alone, (2) an alloy of two or more kinds of platinum group metals, (3) an alloy of a platinum group metal and another metal, (4) a mixed oxide or multiple oxide including, as constituent elements, a platinum group metal and a valve metal such as titanium/tantalum, (5) metallic strontium, (6) metallic iron, metallic nickel, (7) metallic lead, lead dioxide, (8) silicon, (9) diamond or graphite (10) oxides such as alumina, mullite and zirconia, (11) carbide such as SiC, (12) nitride such as AlN, (13) a valve metal alone such as titanium, tantalum, and zirconium. Alternatively, the sacrificial electrode 22c may be obtained by forming a catalyst layer on a substrate. In this case, as the substrate, it is possible to apply titanium, zirconium, aluminum, tantalum, niobium, iron, nickel, lead alone, or an alloy thereof, carbon, silicon, ceramics or the like. As the catalyst, a substance exemplified in the above (1) to (12) and having a catalytic function can be applied. The sacrificial electrode 22c may be formed by processing a plate-shaped member made of the above-mentioned material into a cylindrical shape, or may be formed in a cylindrical shape from a manufacturing stage. In this case, as illustrated in FIG. 3, the sacrificial electrode 22c itself functions as a flow path of the electrolyte.

Alternatively, the sacrificial electrode may be obtained by processing a plate-like member having a mesh or holes, such as a punching metal, into a cylindrical shape. In the case of using a member having holes as the sacrificial electrode, the sacrificial electrode 22c is inserted into a cylindrical support member (for example, a cylinder made of a metal such as titanium or a tubular resin) having no hole, and then inserted into the shaft portion 22a. The sacrificial electrode does not constantly needed to be processed into a cylindrical shape, and for example, a plate member may be inserted into the support member in a state of being curved so as to have a C-shaped cross-section or kept in the flat plate shape. In the case where the sacrificial electrode is a metal, the support member and the sacrificial electrode may be coupled by welding or the like in order to prevent the sacrificial electrode from falling off. When an end portion of the sacrificial electrode protrudes from an end portion of the support member at the time of insertion, a state of the sacrificial electrode can be visually checked from the outside of the pipe 13 as described later.

In the case where the sacrificial electrode is made of a metal, a member obtained by directly attaching a sacrificial electrode to a tip of the shaft portion 22a on the pipe 13 side by welding or the like can also be used. In this case also, the sacrificial electrode is not constantly needed to be processed into a cylindrical shape, and the plate member is attached to the shaft portion 22a in a state of being curved or kept in the flat plate shape.

A material of the sacrificial electrode 22c may be a material same as the material of the shaft portion 22a and the flange portion 22b. In other words, the entire sacrificial electrode unit 22 may be used as a sacrificial electrode. In this case, since the entire sacrificial electrode unit 22 is formed of the sacrificial electrode material, a period during which the sacrificial electrode unit 22 can function as the sacrificial electrode can be prolonged.

The sacrificial electrode 22c is also inserted into an end portion of the pipe 13. Thus, the sacrificial electrode unit 22 is interposed between the nozzle 15 and the pipe 13. When inserted into the pipe 13, the end portion of the sacrificial electrode 22c on the opposite side of the shaft portion 22a is positioned on a deeper side (opposite side of the end portion of the pipe 13) than an attachment position of the second pipe joint 24. Since the pipe 13 is formed of the transparent or translucent insulating material, a person can visually check a state of the sacrificial electrode 22c from the outside of the pipe 13.

The inside of the nozzle 15, the inside of the shaft portion 22a of the sacrificial electrode unit 22, the inside of the sacrificial electrode 22c, and the inside of the pipe 13 are used as the flow paths of electrolyte L.

The nozzle 15 and the sacrificial electrode unit 22 are liquid-tightly connected by the first pipe joint 23 in a detachable manner. The first pipe joint 23 can be operated from the outside. The details of the first pipe joint 23 are not limited, but may be exemplified as follows. An example of the first pipe joint 23 includes a cylindrical main wall portion 23a and an end wall portion 23b located at an end of the main wall portion 23a and projecting radially inward. A female thread is formed on an inner peripheral surface of the main wall portion 23a. For example, the first pipe joint 23 is a metallic cap nut.

Unlike an ordinary cap nut, a through hole 23c is formed at the end wall portion 23b. The shaft portion 22a of the sacrificial electrode unit 22 is inserted into the through hole 23c, and the flange portion 22b of the sacrificial electrode unit 22 is arranged inside the main wall portion 23a.

A male thread formed on the head portion 15b of the nozzle 15 is screwed into the female thread on the inner peripheral surface of the main wall portion 23a. Thus, the first pipe joint 23 is connected to the nozzle 15.

An annular spacer 21a formed of an insulating material (for example, polytetrafluoroethylene) is interposed between the head portion 15b of the nozzle 15 and the flange portion 22b of the sacrificial electrode unit 22. Additionally, an annular spacer 21b formed of an insulating material (for example, polytetrafluoroethylene) is interposed also between the flange portion 22b of the sacrificial electrode unit 22 and the end wall portion 23b of the first pipe joint 23. These spacers 21a and 21b are arranged inside the main wall portion 23a of the first pipe joint 23. The shaft portion 22a of the sacrificial electrode unit 22 is inserted into the through hole of the spacer 21b.

When the first pipe joint 23 is connected to the nozzle 15, the spacer 21a, flange portion 22b of the sacrificial electrode unit 22, and spacer 21b are pressed against the end wall portion 23b of the first pipe joint 23 by the head portion 15b of the nozzle 15. Thus, the nozzle 15 is liquid-tightly connected to the sacrificial electrode unit 22 by the first pipe joint 23.

The spacer 21a formed of the insulating material is provided in order to secure a space between the nozzle 15 formed of the conductive material and the sacrificial electrode unit 22 formed of the conductive material. Since the sacrificial electrode unit 22 is separated from the nozzle 15, even when the sacrificial electrode unit 22 is deformed due to corrosion, detachment from the nozzle 15 is easily performed.

For this reason, in the case where the first pipe joint 23 is formed of a conductive material, the outer diameter of the flange portion 22b is designed smaller than an inner diameter of the main wall portion 23a such that the flange portion 22b of the sacrificial electrode unit 22 is prevented from contacting the inner peripheral surface of the main wall portion 23a of the first pipe joint 23.

In the case where the first pipe joint 23 is formed of the conductive material, the spacer 21b formed of the insulating material is provided in order to secure a space between the end wall portion 23b of the first pipe joint 23 and the sacrificial electrode unit 22 formed of the conductive material. Since the sacrificial electrode unit 22 is separated from the end wall portion 23b of the first pipe joint 23, current is prevented from flowing from the nozzle 15 to the sacrificial electrode unit 22 via the first pipe joint 23, and even when the sacrificial electrode unit 22 is deformed due to corrosion, detachment from the pipe joint 23 is easily performed.

However, in the case where the first pipe joint 23 is formed of an insulating material, the spacer 21b is not indispensable. In this case, the sacrificial electrode unit 22 may contact the first pipe joint 23, and the flange portion 22b of the sacrificial electrode unit 22 may be pressed in a manner contacting the end wall portion 23b of the first pipe joint 23.

The sacrificial electrode unit 22 and the pipe 13 are liquid-tightly connected by the second pipe joint 24 in a detachable manner. The second pipe joint 24 can be operated from the outside. The details of the second pipe joint 24 are not limited, but may be exemplified as follows. As described above, the sacrificial electrode 22c of the sacrificial electrode unit 22 is inserted into the end portion of the pipe 13 formed of the flexible material. An example of the second pipe joint 24 includes a fastening tool arranged around the pipe 13 formed of the flexible material, and adapted to fix the end portion of the pipe 13 to the sacrificial electrode 22c by radially reducing the end portion of the pipe.

The example of the second pipe joint 24 includes a connecting pipe 24a, two ferrules 24b, 24c arranged on inner sides at both ends of the connecting pipe 24a, and two nuts 24d, 24e arranged on outer sides at the both ends of the connecting pipe 24a. The connecting pipe 24a and the ferrules 24b, 24c are formed of an insulating material such as polytetrafluoroethylene. The nuts 24d, 24e are formed of an insulating material such as perfluoroalkoxy fluorine resin (PFA).

Each of the both ends has an inner diameter larger than that of a remaining portion in the inner peripheral surface of the connecting pipe 24a, and the ferrules 24b and 24c that are tubes are inserted into the both ends. Additionally, male threads are formed at the both ends of the connecting pipe 24a, and the two nuts 24d, 24e are screwed into the threads respectively.

The ferrule 24b and the nut 24d are arranged around the shaft portion 22a of the sacrificial electrode unit 22. The ferrule 24b on the inner side thereof is radially reduced and fixed to the shaft portion 22a by fastening the nut 24d to the end portion of the connecting pipe 24a.

The ferrule 24c and the nut 24e are arranged around an overlapping portion of the sacrificial electrode 22c and the pipe 13. The ferrule 24c on the inner side thereof is radially reduced and fixed to the pipe 13 by fastening the nut 24e to the end portion of the connecting pipe 24a. At the same time, the end portion of the pipe 13 is radially reduced and fixed to the sacrificial electrode 22c. Thus, the pipe 13 is liquid-tightly connected to the sacrificial electrode unit 22 by the second pipe joint 24. The connecting pipe 24a, ferrule 24c, and nut 24e can be deemed as fastening tools adapted to fix the end portion of the pipe 13 to the sacrificial electrode 22c.

The sacrificial electrode attachment structure 20 is provided with a mechanism to electrically connect the sacrificial electrode unit 22, the nozzle 14, and the nozzle 15. In the following description, the sacrificial electrode attachment structure 20 including the nozzle 15 is taken as an example, but the sacrificial electrode attachment structure 20 including the nozzle 14 is also similar, and the nozzle 15 should be read as the nozzle 14 as necessary. Specifically, a wire attachment portion 25 made of a metal plate is joined to an outer peripheral surface of the shaft portion 15a of the nozzle 15. Similarly, a wire attachment portion 26 is also joined to an outer peripheral surface of the shaft portion 22a of the sacrificial electrode unit 22. A wire 27 formed of a conductive material has both ends joined to the wire attachment portions 25, 26.

Leakage current flowing between the sacrificial electrode unit 22 and the nozzle 15 passes through the wire 27. Therefore, in the case of measuring the leakage current, the current flowing through the wire 27 is to be measured. Therefore, the leakage current can be easily measured.

Figure 4:
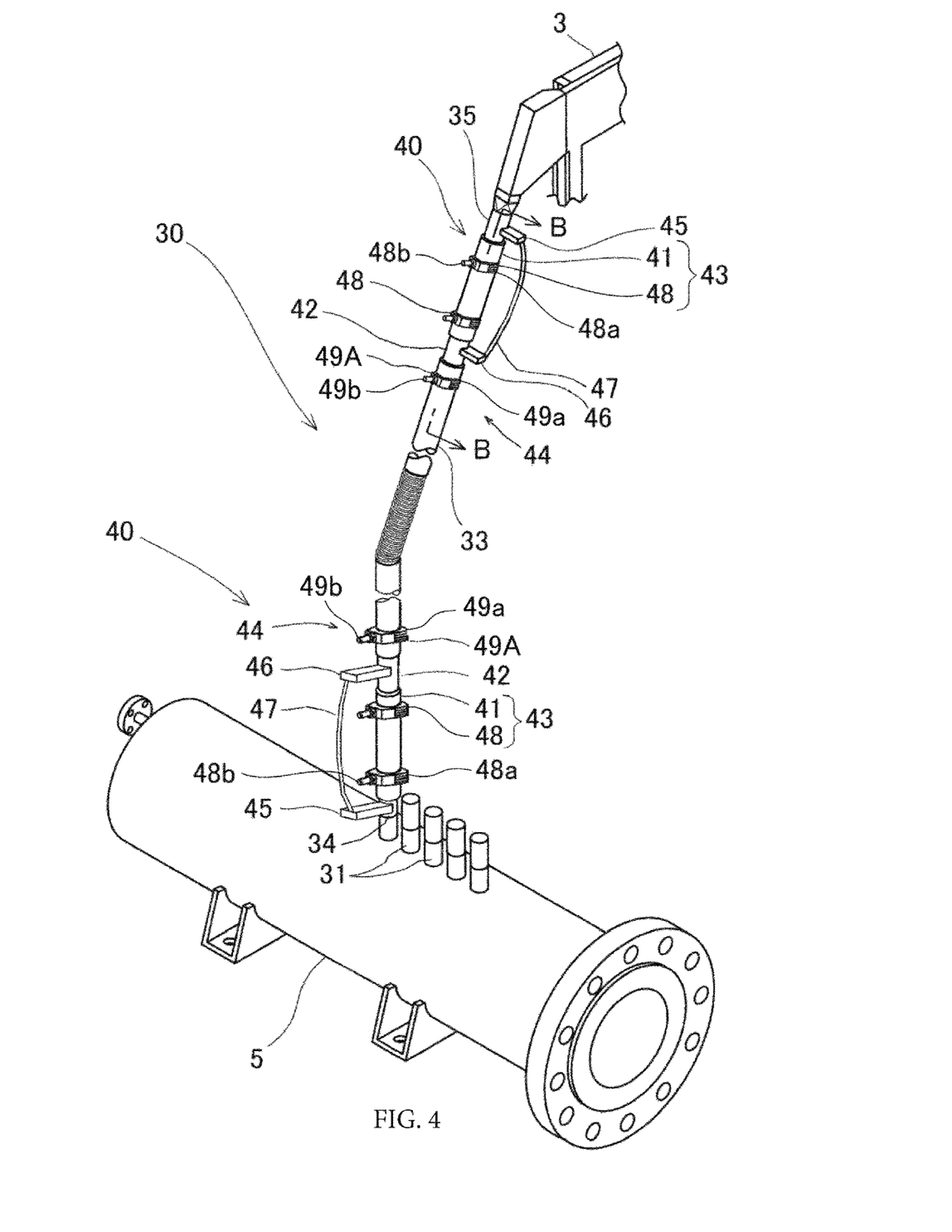
FIG. 4 is a perspective view of an electrolyte discharge path of the electrolytic apparatus.

FIG. 4 is a perspective view of the electrolyte discharge path 30 adapted to connect the electrolyte discharge manifold 5 to the electrolyzer 3. FIG. 4 illustrates only one electrolyte discharge path 30 for simplification, but actually, a plurality of electrolyte discharge paths 30 is provided for the plurality of units 3A, 3B of the electrolyzer 3, and each electrolyte discharge path 30 has a similar structure.

In each electrolyte discharge path 30, two sacrificial electrode units 42 are provided. More specifically, one sacrificial electrode unit 42 is provided at an end portion of the electrolyte discharge path 30 on the electrolyzer 3 side, and the other sacrificial electrode unit 42 is provided at an end portion of the electrolyte discharge path 30 on the electrolyte discharge manifold 5 side. In the case of connecting the electrolyte discharge manifold 5 to the electrolyzer 3 by the plurality of electrolyte discharge paths 30, current flows from a member with high potential to a member with low potential. For example, a current path passing through the electrolyte discharge path 30 and the electrolyte discharge manifold 5 from an anode inside the electrolyzer 3 is generated by the discharged electrolyte. Therefore, corrosion in not only the electrolyzer but also the electrolyte discharge manifold 5 should be considered. Since each of the electrolyte discharge paths 30 is provided with the two sacrificial electrode units 42 on the electrolyzer 3 side and the electrolyte discharge manifold 5 side respectively, the electrolyzer 3 and the electrolyte discharge manifold 5 are adequately protected.

A structure of the electrolyte discharge path 30 will be described more specifically. A nozzle (first pipe) 34 is connected to an electrolyte discharge port of the electrolyte discharge manifold 5 by a nut 31. In the present embodiment, a pipe connected to the electrolyte discharge manifold 5 is the nozzle 34.

The nozzle 34 is connected to the sacrificial electrode unit 42 by a first pipe joint 43. The sacrificial electrode unit 42 is connected to a pipe (second pipe) 33 by a second pipe joint 44. The pipe 33 is formed of a transparent or translucent flexible insulating material such as a perfluoroalkoxy fluorine resin (PFA) or the like.

Furthermore, the pipe 33 is connected to the other sacrificial electrode unit 42 by the other second pipe joint 44. The sacrificial electrode unit 42 is connected to a nozzle (first pipe) 35 by the other first pipe joint 43. The nozzle 35 is a pipe connected to or integrally provided with the electrolyzer 3.

Thus, the electrolyte discharge path 30 includes, in the order from the electrolyte discharge manifold 5 side, the nozzle 34, first pipe joint 43, sacrificial electrode unit 42, second pipe joint 44, pipe 33, second pipe joint 44, sacrificial electrode unit 42, first pipe joint 43, and nozzle 35 located on the electrolyzer 3 side. In the electrolyte discharge path 30, two sacrificial electrode attachment structures 40 are provided at the electrolyte discharge path 30 for the two sacrificial electrode units 42. The pipe 33 can be deemed to be shared by the two sacrificial electrode attachment structures 40.

Figure 5:
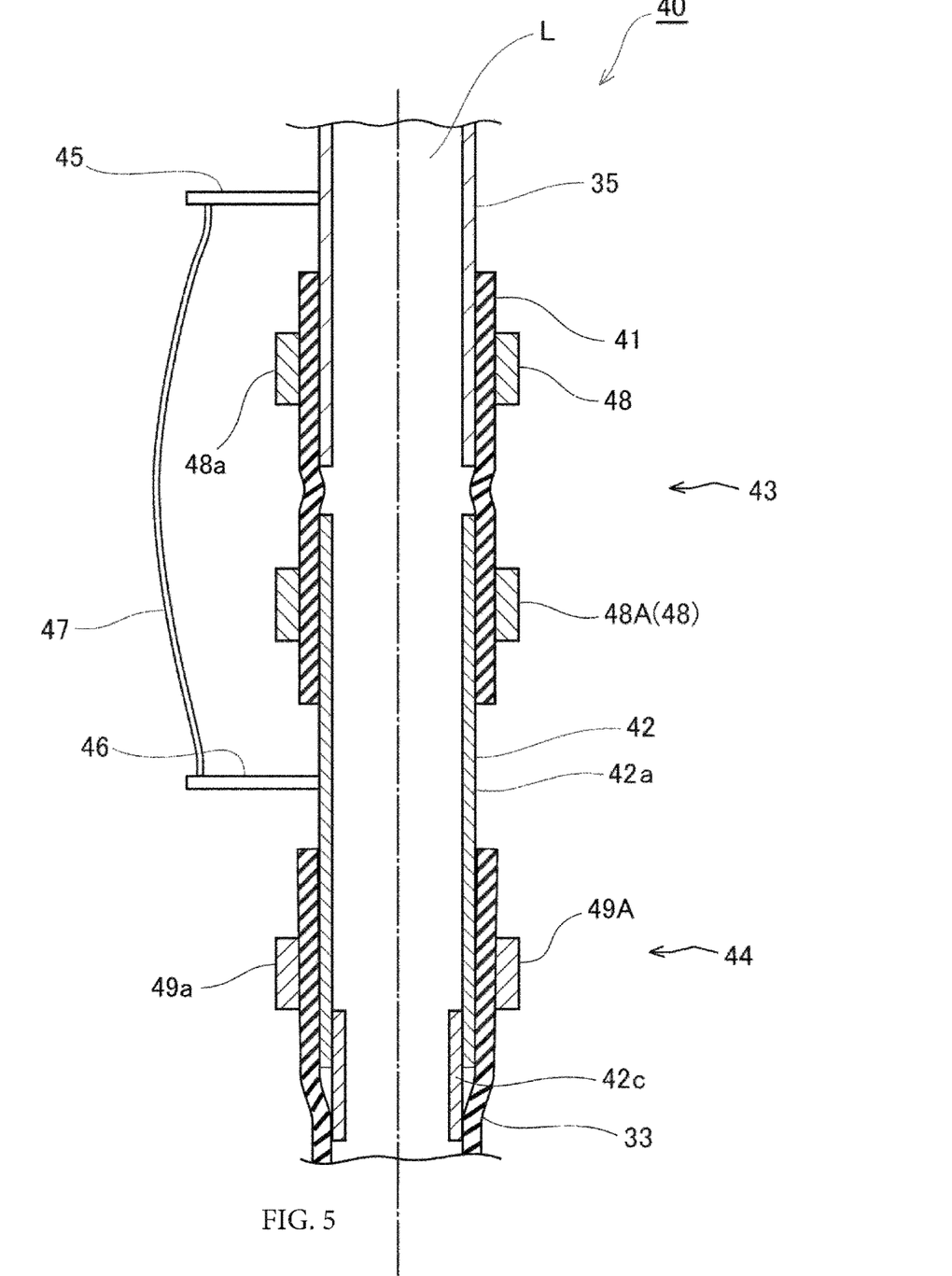
FIG. 5 is a cross-sectional view of the sacrificial electrode attachment structure provided in the electrolyte discharge path of the electrolytic apparatus.

FIG. 5 is a cross-sectional view taken along a line B-B in FIG. 4 and illustrates the sacrificial electrode attachment structure 40 provided at the electrolyte discharge path of the electrolyzer 3. The sacrificial electrode attachment structure 40 in FIG. 5 is the attachment structure located on the electrolyzer 3 side in FIG. 4, and includes the nozzle 35. The attachment structure 40 on the electrolyte discharge manifold 5 side in FIG. 4 is basically the same as this attachment structure except that the nozzle 35 is replaced by the nozzle 34.

The sacrificial electrode attachment structure 40 includes the nozzle 35, pipe 33, cylindrical sacrificial electrode unit 42, first pipe joint 43, and second pipe joint 44. The first pipe joint 43 liquid-tightly connects the nozzle 35 to the sacrificial electrode unit 42 in a detachable manner. The second pipe joint 44 liquid-tightly connects the pipe 33 to the sacrificial electrode unit 42 in a detachable manner.

The nozzle 35 is provided in each of the units 3A, 3B of the electrolyzer 3. The nozzle 35 is formed of a high corrosion-resistant conductive material such as a metal, more specifically, titanium or a titanium alloy. The nozzle 35 is formed in a cylindrical shape and connected to the electrolyzer 3. In other words, the inside of the electrolyzer 3 is in communication with the inside of the nozzle 35.

The sacrificial electrode unit 42 includes a shaft main body 42a and a sacrificial electrode 42c. The shaft main body 42a is formed in a cylindrical shape and arranged coaxially with the nozzle 35. The shaft main body 42a has an outer diameter and an inner diameter substantially equal to an outer diameter and an inner diameter of the nozzle 35. The outer diameter of the shaft main body 42a is substantially equal to an inner diameter of the pipe 33. The shaft main body 42a is made of, for example, a cylinder made of a metal such as titanium or a tubular resin. The shaft main body 42a is inserted into the pipe 33.

The sacrificial electrode 42c is a member coaxially inserted into an end portion of the shaft main body 42a on the pipe 33 side. The sacrificial electrode 42c is formed of a material exhibiting high durability during electrolysis. Specifically, a material same as that of the sacrificial electrode 22c (the above-mentioned materials (1) to (13)) is adopted. Alternatively, similar to the sacrificial electrode 22c, the sacrificial electrode 42c may also be obtained by forming a catalyst layer on a substrate.

The sacrificial electrode 42c may be formed by processing a plate-shaped member made of the above-mentioned material into a cylindrical shape, or may be formed in a cylindrical shape from a manufacturing stage. Alternatively, the sacrificial electrode 42c may be obtained by processing a plate-like member having a mesh or holes, such as a punching metal, into a cylindrical shape or a curved in a C-shape. Also, the sacrificial electrode 42c may be a flat plate. In the case where the sacrificial electrode 42c is a metal, a support member and the sacrificial electrode may be coupled by welding or the like in order to prevent the sacrificial electrode from falling off. When an end portion of the sacrificial electrode 42c protrudes from an end portion of the shaft main body 42a at the time of insertion, a state of the sacrificial electrode can be visually checked from the outside of the pipe 33 as described later.

In the case where the sacrificial electrode is made of a metal, a member obtained by directly attaching a sacrificial electrode to a tip of the shaft main body 42a on the pipe 33 side by welding or the like can also be used as the sacrificial electrode unit 42. In this case also, the sacrificial electrode is not needed to be processed into a cylindrical shape, and the plate member is attached to the shaft main body 42a in a state of being curved or kept in the flat plate shape.

Alternatively, the shaft main body 42a may be omitted, and the sacrificial electrode 42c itself may constitute the sacrificial electrode unit 42. In this case, when the sacrificial electrode 42c is processed into a cylindrical shape, liquid-tightness can be achieved, and the sacrificial electrode can also function as a flow path of the electrolyte.

A material of the sacrificial electrode 42c is different from the material of the shaft main body 42a. In other words, the end portion of the sacrificial electrode unit 42 on the pipe 33 side is the sacrificial electrode 42c, and a remaining portion thereof is formed of a metal different from the material of the sacrificial electrode 42c.

However, the material of the sacrificial electrode 42c may be a material same as the material of the shaft main body 42a. In other words, the entire sacrificial electrode unit 42 can be used as a sacrificial electrode. In this case, since the entire sacrificial electrode unit 42 is formed of the sacrificial electrode material, a period during which the sacrificial electrode unit 42 can function as the sacrificial electrode can be prolonged.

The sacrificial electrode 42c is inserted into the end portion of the pipe 33. Thus, the sacrificial electrode unit 42 is interposed between the nozzle 35 and the pipe 33. When inserted into the pipe 33, the end portion of the sacrificial electrode 42c is located on a deeper side (opposite side of the end portion of the pipe 33) than an attachment position of the second pipe joint 44. Since the pipe 33 is formed of the transparent or translucent insulating material, a person can visually check a state of the sacrificial electrode 42c from the outside of the pipe 33.

The inside of the nozzle 35, the inside of the shaft main body 42a of the sacrificial electrode unit 42, the inside of the sacrificial electrode 42c, and the inside of the pipe 33 are used as the flow paths of electrolyte L.

The nozzle 35 and the sacrificial electrode unit 42 are liquid-tightly connected by a first pipe joint 43 in a detachable manner. The first pipe joint 43 can be operated from the outside. The details of the first pipe joint 43 are not limited, but may be exemplified as follows. An example of the first pipe joint 43 includes a connecting pipe 41 and a fastening tool 48. The connecting pipe 41 has flexibility and is formed of an insulating material. An end portion of the nozzle 35 and an end portion of the shaft main body 42a of the sacrificial electrode unit 42 are inserted into the connecting pipe 41 while keeping a space therebetween. The fastening tool 48 is arranged around the connecting pipe 41 and adapted to fix the connecting pipe 41 to the nozzle 35 and the shaft main body 42a by radially reducing the connecting pipe 41.

In the case where the connecting pipe 41 is formed of the flexible material and sufficiently firmly fixed in a state that the end portion of the nozzle 35 is inserted into the connecting pipe 41, the fastening tool 48 is not constantly necessary.

As illustrated in FIG. 4, the fastening tool 48 includes: an annular member 48a surrounding an entire circumference of the connecting pipe 41, and a locking mechanism 48b adapted to hold a state that a circumference length of the annular member 48a around the connecting pipe 41 is reduced. The locking mechanism 48b may be, for example, a mechanism using screws or other fasteners.

As illustrated in FIG. 5, the fastening tool 48 is arranged around an overlapping portion of the connecting pipe 41 and the nozzle 35. A fastening tool 48 is also arranged around an overlapping portion of the connecting pipe 41 and the sacrificial electrode unit 42. Since the circumferential length of the annular member 48a around the connecting pipe 41 illustrated in FIG. 4 is reduced, the connecting pipe 41 is radially reduced and fixed to the nozzle 35 and the shaft main body 42a. Thus, the sacrificial electrode unit 42 is liquid-tightly connected to the nozzle 35 by the first pipe joint 43.

The sacrificial electrode unit 42 and the pipe 33 are liquid-tightly connected by the second pipe joint 44 in a detachable manner. The second pipe joint 44 can be operated from the outside. The details of the second pipe joint 44 are not limited, but may be exemplified as follows. As described above, the sacrificial electrode unit 42 is inserted into the end portion of a pipe 33 formed of a flexible material. An example of the second pipe joint 44 includes a fastening tool 49A. The second pipe joint 44 is arranged around the pipe 33 formed of the flexible material, and fixed to the sacrificial electrode unit 42 by radially reducing the end portion of the pipe 33.

In the case where the pipe 33 is formed of the flexible material and sufficiently firmly fixed in a state that the end portion of the sacrificial electrode unit 42 is inserted into the pipe 33, the fastening tool 49A is not constantly necessary.

Similar to the fastening tool 48 of the first pipe joint 43, the fastening tool 49A includes a locking mechanism 49b and an annular member 49a as illustrated in FIG. 4. The annular member 49a surrounds an entire circumference of the pipe 33. The locking mechanism 49b holds a state that a circumferential length of the annular member 49a around the pipe 33 is reduced. The locking mechanism 49b may be, for example, a mechanism using a screw or other fasteners.

As illustrated in FIG. 5, the fastening tool 48 is arranged around an overlapping portion of the pipe 33 and the sacrificial electrode unit 42. Since the circumferential length of the annular member 49a around the pipe 33 illustrated in FIG. 4 is radially reduced, the pipe 33 is reduced and fixed to the sacrificial electrode unit 42. Thus, the sacrificial electrode unit 42 is liquid-tightly connected to the pipe 33 by the second pipe joint 44.

The sacrificial electrode attachment structure 40 is provided with a mechanism to electrically connect the sacrificial electrode unit 42, the nozzle 34, and the nozzle 35. In the following description, the sacrificial electrode attachment structure 40 including the nozzle 35 is taken as an example, but the sacrificial electrode attachment structure 40 including the nozzle 34 is also similar, and the nozzle 35 should be read as the nozzle 34 as necessary. Specifically, a wire attachment portion 45 made of a metal plate is joined to an outer peripheral surface of the nozzle 35. Similarly, a wire attachment portion 46 is also joined to an outer peripheral surface of the shaft main body 42a of the sacrificial electrode unit 42. A wire 47 formed of a conductive material has both ends joined to the wire attachment portions 45, 46.

Leakage current flowing between the sacrificial electrode unit 42 and the nozzle 35 passes through the wire 47. Therefore, in the case of measuring the leakage current, the current flowing through the wire 47 is to be measured. Therefore, the leakage current can be easily measured.

Meanwhile, in the present invention, the structures of FIGS. 4 and 5 can be applied, instead of the structures in FIGS. 2 and 3, as a sacrificial electrode attachment structure in the electrolyte supply path. Similarly, the structures of FIGS. 2 and 3 can be applied, instead of the structures in FIGS. 4 and 5, as a sacrificial electrode attachment structure in the electrolyte discharge path.

Next, a replacement method of the sacrificial electrode 22c in the sacrificial electrode attachment structure 20 on the electrolyte supply side of the electrolyzer 3 will be described with reference to FIG. 2 and FIG. 3. In the following description, the sacrificial electrode attachment structure 20 including the nozzle 15 is taken as an example, but a replacement method of the sacrificial electrode 22c in the sacrificial electrode attachment structure 20 including the nozzle 14 is similar, and the nozzle 15 should be read as the nozzle 14 as necessary.

Since the pipe 13 is formed of a material through which the sacrificial electrode can be visually checked from the outside, it is possible to visually confirm a depletion state of the sacrificial electrode 22c provided inside the pipe 13. For example, in the case where it is determined in visual confirmation performed by a person that the sacrificial electrode 22c is needed to be replaced, the sacrificial electrode unit 22 is replaced as follows after stopping operation of the electrolytic apparatus 1.

First, the person turns the nuts 24d, 24e of the second pipe joint 24 with respect to the connecting pipe 24a in a direction in which a fastened state is loosened to release a locked state by the ferrules 24b, 24c. Then, the sacrificial electrode unit 22 is separated from the pipe 13. The sacrificial electrode unit 22 can be easily detached from the pipe 13 by operating the fastening tool including the connecting pipe 24a, ferrule 24c, and nut 24e.

Next, the person separates the wire 27 from the wire attachment portion 26. Additionally, a screwed state between the female thread of the inner peripheral surface of the main wall portion 23a and the male thread of the outer peripheral surface of the head portion 15b of the nozzle 15 is released by turning the first pipe joint 23. Then, the sacrificial electrode unit 22 is separated from the nozzle 15. The sacrificial electrode unit 22 can be easily detached from the nozzle 15 by releasing the screwed state between the head portion 15b located at the end portion of the nozzle 15 and the main wall portion 23a. Thus, the used sacrificial electrode unit 22, the first pipe joint 23, the second pipe joint 24, and the wire attachment portion 26 are separated from the pipe 13 and the nozzle 15.

After that, the shaft portion 22a of the new sacrificial electrode unit 22 is inserted into the through hole of the spacer 21b and the through hole 23c of the first pipe joint 23, and the wire attachment portion 26 is attached to the shaft portion 22a. Additionally, the ferrule 24b and the nut 24d of the second pipe joint 24 are attached to the shaft portion 22a.

After that, the first pipe joint 23 is turned such that the spacer 21a is interposed between the head portion 15b of the nozzle 15 and the flange portion 22b of the sacrificial electrode unit 22. In other words, the male thread of the outer peripheral surface of the head portion 15b of the nozzle 15 is engaged with the female thread of the inner peripheral surface of the main wall portion 23a, and the spacer 21a, flange portion 22b, and spacer 21b are firmly sandwiched between the head portion 15b and the end wall portion 23b. Thus, the nozzle 15 and the sacrificial electrode unit 22 are connected by the first pipe joint 23.

Furthermore, the ferrule 24c and the nut 24e of the second pipe joint 24 are attached to the end portion of the pipe 13. Then, the nut 24d is screwed into one end portion of the connecting pipe 24a of the second pipe joint 24, and the ferrule 24b is fixed to the sacrificial electrode unit 22 by turning the nut 24d. Additionally, the nut 24e is screwed into the other end portion of the connecting pipe 24a of the second pipe joint 24, and the ferrule 24c is fixed to the pipe 13 by turning the nut 24e. Thus, the pipe 13 is connected to the sacrificial electrode unit 22 by the second pipe joint 24. Finally, the wire 27 is connected to the wire attachment portion 26.

Next, a replacement method of the sacrificial electrode 42c in the sacrificial electrode attachment structure 40 on the electrolyte discharge side of the electrolyzer 3 will be described with reference to FIGS. 4 and 5. In the following description, the sacrificial electrode attachment structure 40 including the nozzle 35 is taken as an example, but a replacement method of the sacrificial electrode 22c of the sacrificial electrode attachment structure 20 including the nozzle 34 is similar, and the nozzle 35 should be read as the nozzle 34 as necessary.

Since the pipe 33 is formed of a material through which the sacrificial electrode can be visually checked from the outside, it is possible to visually confirm a depletion state of the sacrificial electrode 42c provided inside the pipe 33. For example, in the case where it is determined in this visual confirmation that the sacrificial electrode 42c is needed to be replaced, the sacrificial electrode unit 42 is replaced as follows after stopping operation of the electrolytic apparatus 1.

In the case of measuring leakage current flowing through the wire 47 between the sacrificial electrode unit 42 and the nozzle 35, current density can be obtained from the measured current and an effective electrolytic area of the sacrificial electrode. When data related to a consumption rate of the sacrificial electrode 42c according to the current density is preliminarily acquired, a consumption level of the sacrificial electrode can be determined from the measured leakage current.

First, a person releases a fastened state of the fastening tool 48A by operating the locking mechanism 48b of the fastening tool 48A provided at the overlapping portion of the connecting pipe 41 and the sacrificial electrode unit 42 out of the fastening tool 48 of the first pipe joint 43. Additionally, a fastened state of the fastening tool 49A is released by operating the locking mechanism 49b of the fastening tool 49A of the second pipe joint 44.

Next, the person separates the wire 47 from the wire attachment portion 46. Additionally, the sacrificial electrode unit 42 is separated from the nozzle 35, and the sacrificial electrode unit 42 is also separated from the pipe 33. The sacrificial electrode unit 42 can be easily detached from the nozzle 35 by operating the fastening tool 48 of the first pipe joint 43. Furthermore, the sacrificial electrode unit 42 can be easily removed from the pipe 33 by operating the fastening tool 49A of the second pipe joint 44. Thus, the used sacrificial electrode unit 42 and the wire attachment portion 46 are separated from the pipe 33 and the connecting pipe 41.

After that, one end portion of the new sacrificial electrode unit 42 is inserted into the connecting pipe 41, and the other end portion of the new sacrificial electrode unit 42 is inserted into the pipe 33. Then, the respective locking mechanisms 49b, 48b of the fastening tool 48A and the fastening tool 49A provided at the overlapping portion of the connecting pipe 41 and the sacrificial electrode unit 42 are operated. Consequently, the sacrificial electrode unit 42 is connected to the nozzle 35 by the fastening tool 48A, and the sacrificial electrode unit 42 is connected to the pipe 33 by the fastening tool 49A. Finally, the wire 47 is connected to the wire attachment portion 46.

As apparent from the above description, according to the present embodiment, since the first pipe joints 23, 43 and the second pipe joints 24, 44 adapted to detachably connect the pipes to the sacrificial electrode units 22, 42 are used, not only the sacrificial electrode units 22, 42 but also the sacrificial electrodes 22c, 42c are easily replaced. The pipes 13 and 33 are formed of the insulating material and are prevented from being corroded by the electrolyte, and the sacrificial electrode units 22, 42 are replaced more easily.

According to the present embodiment, the first pipe joint 23 or 43 connects the nozzle 15 (or 14) or 35 (or 34) to the sacrificial electrode unit 22 or 42 by operation from the outside, and such connection is released by operation from the outside. The second pipe joint 24 or 44 connects the pipe 13 or 33 to the sacrificial electrode unit 22 or 42 by operation from the outside, and such connection is released by operation from the outside. Therefore, deterioration caused by corrosion of the pipe joints 23, 24, 43, 44 due to the electrolyte L and degradation of operability of the pipe joints 23, 24, 43, 44 accompanying the corrosion can be suppressed, and therefore, the sacrificial electrode 22c, 42c are easily replaced.

According to the present embodiment, since the pipes 13, 33 are formed of the transparent or translucent material, states of the sacrificial electrodes 22c, 42c inserted into the pipes 13, 33 can be visually checked from the outside of the pipes 13, 33. In other words, since the depletion states of the sacrificial electrodes 22c, 42c can be easily visually confirmed, a replacement plan for the sacrificial electrodes 22c, 42c is easily prepared. Additionally, corrosion and breakage of the electrolytic apparatus 1 caused by unassumed depletion of the sacrificial electrodes 22c, 42c can be suppressed.

Figure 6:
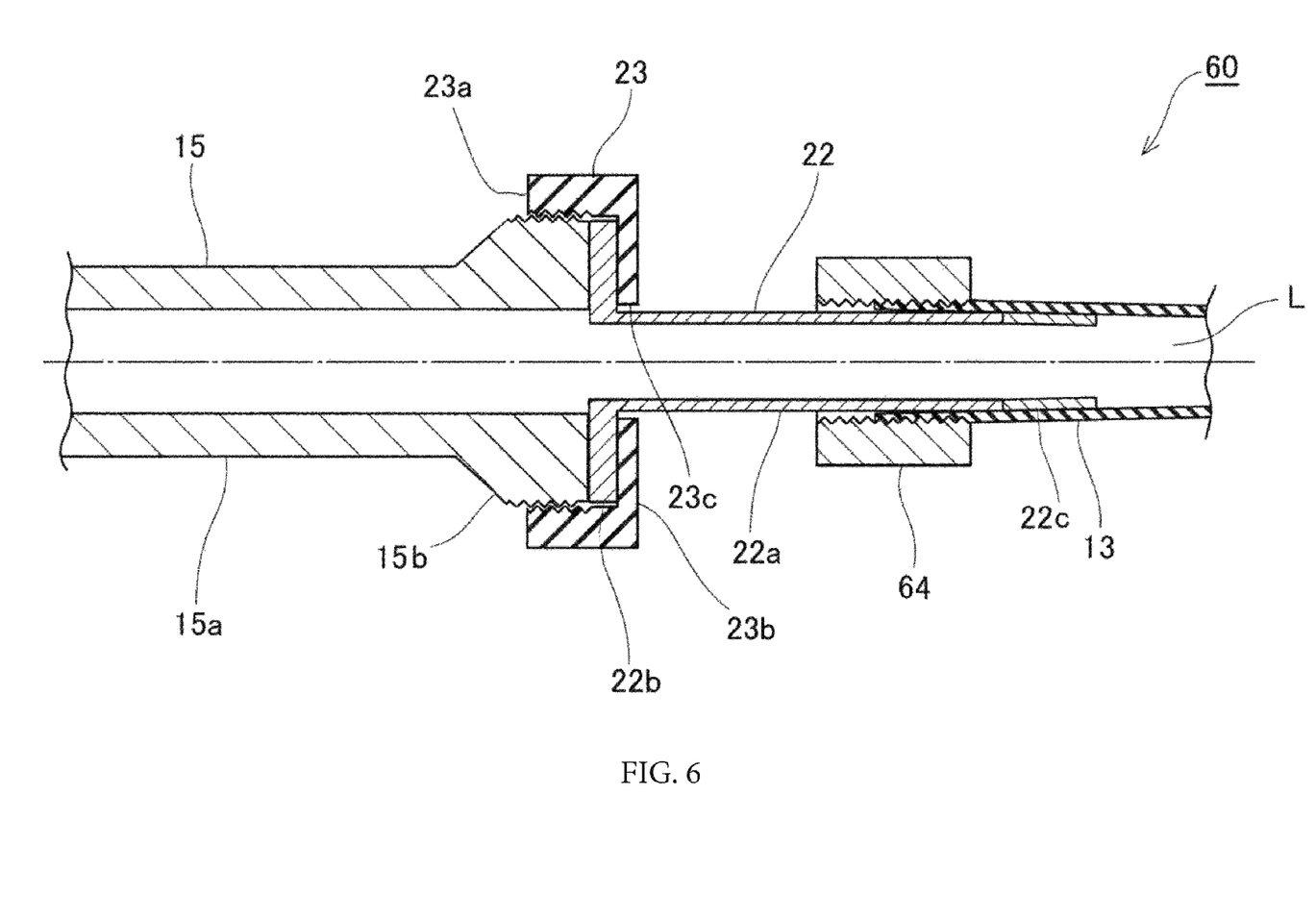
FIG. 6 is a perspective view of an electrolytic apparatus including a sacrificial electrode attachment structure according to a modified example of the present invention.

FIG. 6 illustrates a sacrificial electrode attachment structure 60 according to a modified example of the present invention. The sacrificial electrode attachment structure 60 is the modified example of the sacrificial electrode attachment structure 20 provided in the electrolyte supply path 10.

In this sacrificial electrode attachment structure 60, the wire attachment portions 25, 26 and the wire 27 are not provided. Additionally, the spacers 21a, 21b are not provided, and an end face of the flange portion 22b of the sacrificial electrode unit 22 directly contacts an end face of the head portion 15b of the nozzle 15, and the flange portion 22b directly contacts the end wall portion 23b of the first pipe joint 23.

In the modified example, the sacrificial electrode unit 22 contacts the nozzle 15 formed of the conductive material. However, since a contact interface is flat, even when the interface and the vicinity thereof are corroded, the sacrificial electrode unit 22 is easily detached from the nozzle 15.

In this modified example, preferably, the first pipe joint 23 is formed of an insulating material. Since the first pipe joint 23 is formed of the insulating material, even when the sacrificial electrode unit 22 is corroded, the sacrificial electrode unit 22 is easily detached from the nozzle 15.

Similar to this modified example, the wire attachment portions 45, 46 and the wire 47 may not be provided and an end surface of the sacrificial electrode unit 42 may directly contact an end surface of the nozzle 35 in the sacrificial electrode attachment structure 40 illustrated in FIG. 5. Since the contact interface is also flat in this case, even when the interface and the vicinity thereof are corroded, the sacrificial electrode unit 42 is easily detached from the nozzle 35.

In the modified example illustrated in FIG. 6, the sacrificial electrode 22c is a cylindrical member coaxially joined to the end portion of the shaft portion 22a on the pipe 13 side. The sacrificial electrode 22c has an outer diameter and an inner diameter substantially equal to the outer diameter and the inner diameter of the shaft portion 22a. The sacrificial electrode 22c has a length shorter than a length of the shaft portion 22a.

In this modified example, a second pipe joint 64 is provided instead of the second pipe joint 24. The second pipe joint 64 is a nut in which a female thread is formed on an inner peripheral surface thereof. A male thread to be engaged with the female thread of the second pipe joint 64 is formed on an outer peripheral surface of the end portion of the pipe 13.

The end portion of the sacrificial electrode unit 22 including the sacrificial electrode 22c is inserted into the end portion of the pipe 13. The second pipe joint 64 is arranged around the end portion of the pipe 13, and the female thread of the second pipe joint 64 is engaged with the male thread of the pipe 13, thereby fixing the end portion of the pipe 13 to the sacrificial electrode unit 22 by radially reducing the end portion of the pipe 13. In other words, the second pipe joint 64 functions as a fastening tool.

While the embodiment and modified example of the present invention have been described above, note that the description is not intended to limit the present invention and various modified examples including deletion, addition, and substitution of constituent elements can be considered in the technical scope of the present invention.

For example, in the above-described embodiment and modified example, the sacrificial electrode attachment structure 20 or 60 illustrated in FIG. 3 or 6 is provided on an electrolyte supply side, and the sacrificial electrode attachment structure 40 illustrated in FIG. 5 is provided on an electrolyte discharge side. However, the sacrificial electrode attachment structure 40 may be provided on the electrolyte supply side, and the sacrificial electrode attachment structure 20 or 60 may be provided on the electrolyte discharge side.

In the above-described embodiment, the sacrificial electrode attachment structures are provided on both of the supply side and the discharge side of the electrolyte, but the sacrificial electrode attachment structure may also be provided only on the electrolyte supply side or the electrolyte discharge side.

In the above-described embodiment and modified example, the two sacrificial electrode attachment structures 20, 40, or 60 are provided in each electrolyte path. Specifically, the first pipe 15 or 35 of one sacrificial electrode attachment structure 20, 40, or 60 in each electrolyte path is connected to the electrolyzer 3 or integrally provided, and the first pipe 14 or 34 of the other sacrificial electrode attachment structures 20, 40, or 60 in each electrolyte path is connected to the manifold 4 or 5 or integrally provided. However, in each electrolyte path, the one sacrificial electrode attachment structure 20, 40, or 60 may be provided only on the electrolyzer 3 side or on the manifold 4 or 5 side.

As illustrated in FIGS. 3 and 6, the nozzle 15, sacrificial electrode unit 22, and pipe 13 are linear and mutually coaxial in the above-described embodiment and modified example. Additionally, as illustrated in FIG. 5, the nozzle 35, sacrificial electrode unit 42, and pipe 33 are linear and mutually coaxial. However, any one or all of the above members may be partly curved, or any one of the above members may be eccentric with respect to other members. Particularly, in the above-described embodiment and the modified example, since the pipes 13, 33 and connecting pipe 41 are formed of the flexible material, these members may be actually partly curved.

The material of each member may be formed of a material other than the above-mentioned materials within a range not departing from the scope of the present invention.

REFERENCE SIGNS LIST

L Electrolyte
1 Electrolytic apparatus
3 Electrolyzer
4 Electrolyte supply manifold
5 Electrolyte discharge manifold
10 Electrolyte supply path
13, 33 Pipe (second pipe)
14, 15, 34, 35 Nozzle (first pipe)
15a Shaft portion
15b Head portion
20, 40, 60 Sacrificial electrode attachment structure
21a, 21b Spacer
22, 42 Sacrificial electrode unit
22a Shaft portion
22b Flange portion
22c, 42c Sacrificial electrode
23, 43 First pipe joint
23a Main wall portion
23b End wall portion
23c Through hole
24, 44, 64 Second pipe joint
24a Connecting pipe
24b, 24c Ferrule
24d, 24e Nut
25, 26, 45, 46 Wire attachment portion
27, 47 Wire
30 Electrolyte discharge path
41 Connecting pipe
42a Shaft main body
48, 49A Fastening tool
48a, 49a Annular member

The invention claimed is:

1. A sacrificial electrode attachment structure contacting electrolyte, comprising:
a first pipe in which electrolyte flows;
a second pipe which is formed of an insulating material and allows the electrolyte to flow;
a cylindrical sacrificial electrode unit arranged between the first pipe and the second pipe so as to allow the electrolyte to flow, and including a sacrificial electrode that contacts the electrolyte;
a first pipe joint configured to liquid-tightly connect the first pipe to the sacrificial electrode unit in a detachable manner; and
a second pipe joint configured to liquid-tightly connect the second pipe to the sacrificial electrode unit in a detachable manner, wherein:
the first pipe joint is a part independent of the first pipe and the sacrificial electrode unit,
the second pipe joint is a part independent of the second pipe and the sacrificial electrode unit, and
the sacrificial electrode unit is partly inserted into the second pipe.

2. The sacrificial electrode attachment structure according to claim 1, wherein the second pipe is formed of a material through which the sacrificial electrode can be visually checked from outside.

3. The sacrificial electrode attachment structure according to claim 1, wherein the entire sacrificial electrode unit is the sacrificial electrode.

4. The sacrificial electrode attachment structure according to claim 1, wherein the first pipe is formed of a conductive material, and the sacrificial electrode unit is separated from the first pipe.

5. The sacrificial electrode attachment structure according to claim 4, further comprising a spacer surrounded by the first pipe joint and formed of an insulating material interposed between the sacrificial electrode unit and the first pipe.

6. The sacrificial electrode attachment structure according to claim 1, wherein the sacrificial electrode unit and the first pipe are electrically connected by a wire formed of a conductive material.

7. The sacrificial electrode attachment structure according to claim 1, wherein the first pipe is formed of titanium or a titanium alloy.

8. The sacrificial electrode attachment structure according to claim 1, wherein
the sacrificial electrode unit includes a shaft portion and a flange portion formed at an end portion of the shaft portion and expanding radially outward,
the first pipe joint includes a cylindrical main wall portion and an end wall portion located at an end portion of the main wall portion and projecting radially inward,
a female thread is formed on an inner peripheral surface of the main wall portion,
a male thread is formed at an end portion of the first pipe,
a through hole is formed on the end wall portion, the shaft portion of the sacrificial electrode unit is inserted into the through hole of the end wall portion, the flange portion of the sacrificial electrode unit is arranged inside the main wall portion, and the male thread at the end portion of the first pipe is screwed into the female thread of the main wall portion.

9. The sacrificial electrode attachment structure according to claim 1, wherein the first pipe joint includes:

a connecting pipe having flexibility, formed of an insulating material, and inserted in a state that the first pipe and the sacrificial electrode unit are spaced apart from each other, and a fastening tool arranged around the connecting pipe and configured to fix the connecting pipe to the first pipe and the sacrificial electrode unit by radially reducing the connecting pipe.

10. The sacrificial electrode attachment structure according to claim 1, wherein the second pipe is formed of a flexible material.

11. The sacrificial electrode attachment structure according to claim 10, wherein the second pipe joint includes a fastening tool arranged around the second pipe and configured to fix the second pipe to the sacrificial electrode unit by radially reducing the second pipe.

12. An electrolytic apparatus comprising an electrolyzer configured to perform electrolysis for the electrolyte, wherein the first pipe in the sacrificial electrode attachment structure according to claim 1 is connected to or integrally provided with the electrolyzer.

13. An electrolytic apparatus comprising:

an electrolyzer configured to perform electrolysis for the electrolyte; and a plurality of electrolyte paths connected to electrolyzer, wherein one or more of the sacrificial electrode attachment structures according to claim 1 are provided in the plurality of electrolyte paths.

* * * * *